(12) United States Patent
Manalang et al.

(10) Patent No.: US 11,523,631 B2
(45) Date of Patent: Dec. 13, 2022

(54) AUTOMATED FILL DETECTION FOR PRE-FILLED CONES

(71) Applicant: ISLAND PACKAGING AND IMPORT, LLC, Portland, OR (US)

(72) Inventors: Irvine Alcaraz Manalang, Portland, OR (US); Felix La Pietra, Portland, OR (US); William Cabusao Serafica, Gresham, OR (US); Daniel Anthony Grachico, Beaverton, OR (US)

(73) Assignee: ISLAND PACKAGING AND IMPORT, LLC, Portland, OR (US)

( * ) Notice: Subject to any disclaimer, the term of this patent is extended or adjusted under 35 U.S.C. 154(b) by 12 days.

(21) Appl. No.: 17/105,386

(22) Filed: Nov. 25, 2020

(65) Prior Publication Data

US 2022/0160021 A1    May 26, 2022

(51) Int. Cl.
*A24C 5/54* (2006.01)
*G01F 23/292* (2006.01)
*A24C 5/34* (2006.01)
*A24C 5/32* (2006.01)
*A24C 5/12* (2006.01)

(52) U.S. Cl.
CPC .................. *A24C 5/54* (2013.01); *A24C 5/12* (2013.01); *A24C 5/328* (2013.01); *A24C 5/3412* (2013.01); *G01F 23/292* (2013.01)

(58) Field of Classification Search
CPC ....................................................... A24C 5/54
See application file for complete search history.

(56) References Cited

U.S. PATENT DOCUMENTS

| 4,892,453 | A | * | 1/1990 | Bantien | ................ | A24C 5/352 |
| | | | | | | 414/733 |
| 2013/0152952 | A1 | | 6/2013 | Bao | | |
| 2015/0298321 | A1 | | 10/2015 | Gross | | |
| 2020/0068947 | A1 | * | 3/2020 | Leadbeater | ............. | A24C 5/06 |
| 2021/0392944 | A1 | * | 12/2021 | Kustal | ...................... | A24C 5/02 |

FOREIGN PATENT DOCUMENTS

| KR | 10-1730333 B1 | 4/2017 |
| KR | 10-2018-0134492 A | 12/2018 |
| KR | 10-2019-0013040 A | 2/2019 |

\* cited by examiner

*Primary Examiner* — Eric Yaary
(74) *Attorney, Agent, or Firm* — Schwabe Williamson & Wyatt, P.C.

(57) ABSTRACT

Methods and apparatuses for detecting the fill height of a pre-filled cone and closing the cone are disclosed. A height detector, such as a laser rangefinder, detects the height of a pre-filled cone. A gripper then grips the pre-filled cone at the height plus a predetermined offset, the offset calculated to result in an optimum packing of cone fill material. The gripper then closes the cone by rotating to form a twist, which is then trimmed to the height plus the predetermined offset. Other embodiments may be described and/or claimed.

4 Claims, 8 Drawing Sheets

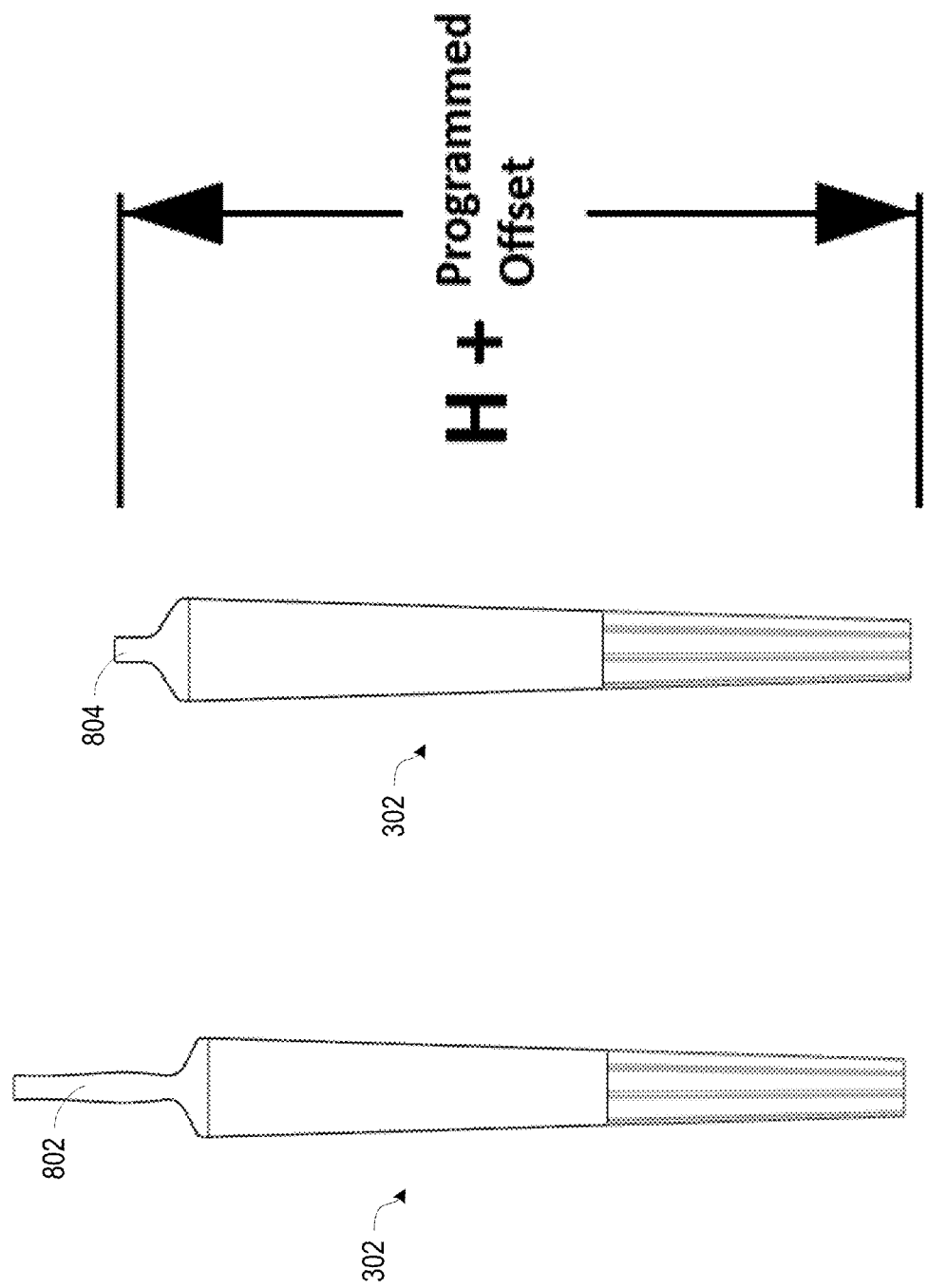

AUTOMATED FILL DETECTION FOR PRE-FILLED CONES

TECHNICAL FIELD

Disclosed embodiments are directed to automatic machines for processing smoking materials, and specifically to machines that twist close and cut cones that are prefilled with smoking material.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Smoking materials, regardless of type, may be placed into a paper cone or similar combustible material which retains the material even while being subject to combustion as the smoking materials are consumed. The paper is then typically closed over the smoking materials to retain the materials in place. The way in which the paper is closed or secured as well as how the material is packed into the paper can further affect how the material burns, with different densities potentially offering different burn rates and helping to promote or hinder combustion. Where a paper cone is selected, the paper cone is typically constructed by wrapping thin paper, such as cigarette paper, around the end of a tube. The tube itself may be at least partially conical in shape, and so help to form the cone into an overall frusto-conical shape. Material to be smoked is first loaded into the open end of the cone that is distal from the tube end, then potentially packed to a desired density before securing by closing the cone.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 8 illustrates the height calculation for trimming a closed cone, according to various embodiments.

DETAILED DESCRIPTION

Figure 1:
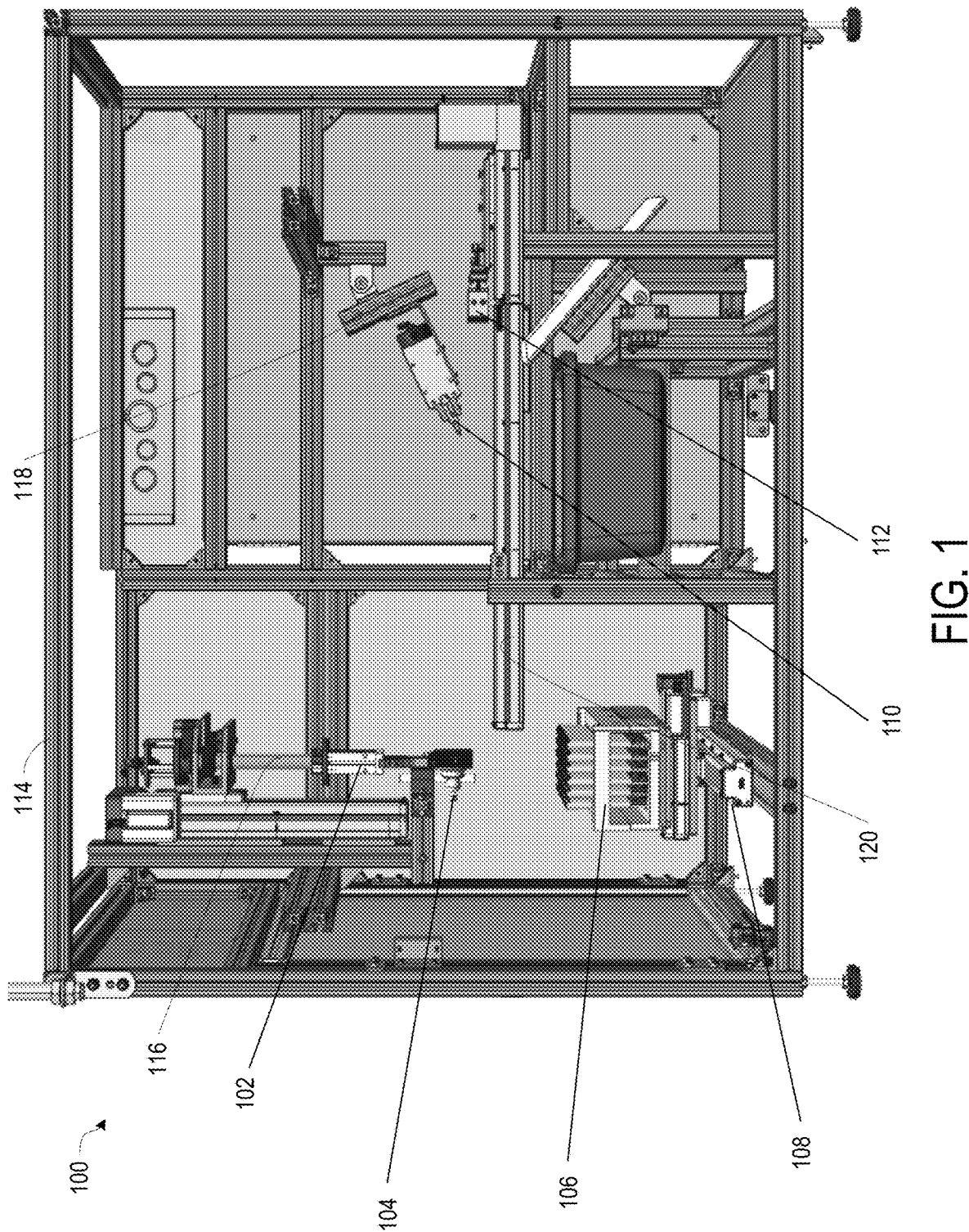
FIG. 1 is a side view of an example machine for automatically detecting and closing pre-filled cones, according to various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Obtaining a cone that is ideally packed for a consistent burn while smoking depends, at least partially, on a consistent closing of the cone. A consistent closing can help ensure a relatively uniform packing and density of the material at the time it is ignited, while still allowing air and smoke to flow through the material as the cone is smoked. The cone is ideally closed such that the material to be burned is not loose or subject to movement within the cone, so that a consistent packing of the material is maintained until ignition. A cone that is insufficiently or loosely closed may allow material to shift within the cone. When the material shifts, it may create gaps within the column of material contained in the cone, causing potential interruptions in burning and requiring the cone to be relit. Alternatively or additionally, where the material is too loose it may be subject to falling out while being consumed, wasting material and likely requiring a relight. Conversely, if the cone is closed too tightly, air may be unable to smoothly flow through the cone, causing the cone to be difficult to smoke. Furthermore, attempting to close the cone too tightly may cause the cone paper, which is typically similar to rice paper in thickness, to rupture from excessive pressure. At best, this requires the cone to be replaced and the material to be repacked. At worst, the cone may rupture on the user and cause material loss and waste.

The challenge of obtaining an ideal closing that maintains the packed material at a consistent density to maximize a consistent burn is exacerbated by the nature of the material to be burned. The material is typically an organic substance obtained from plants, and often presents as irregularly shaped pieces of vegetation that vary in size and hardness. Even if filled with precisely identical weights of matter, two different cones will fill to slightly different levels due to the natural variations in the material, being an organic substance. Thus, a proper closure that results in a consistent pack and burn must take into account these slight differences in the actual fill level from cone to cone.

Cones may be closed manually, typically by a person gripping an unfilled end of the cone and twisting it shut until the twist reaches the top of the fill. Manual closing allows the person to twist the cone end until the person determines that a proper closure is obtained, with the person watching and/or feeling the cone to determine when it is sufficiently closed and properly packed. When filling and closing large quantities of cones, such as in a commercial production environment, manual closing of the cones may be unacceptably tedious and time consuming. Using a machine to automatically close the cones may thus be preferred. However, machines typically work best when filled cones are dimensionally consistent, as machines are typically programmed to execute steps in a repeatable fashion over repeatable distances. Thus, cones prefilled with organic material of irregular shape may vary enough in fill height to result in inconsistent closures when processed by a machine that cannot account for the variability in fill height.

Disclosed embodiments include machines configured to automatically close and trim pre-filled cones. Machines according to the disclosed embodiments sense the height of the fill of each cone prior to closing, and based on the sensed height, determine the appropriate point at which to grip the cone and/or the appropriate number of turns to close. Thus, the machines are able to provide closed cones that are consistently and ideally packed. Furthermore, the machines may be equipped with gripper arms configured to securely hold each cone to allow it to be twisted, while minimizing any potential damage or rupturing of the cone while being closed, trimmed, and handled.

FIG. 1 depicts a front view of a machine 100 configured to close and trim pre-filled cones, according to one possible embodiment. Machine 100 includes a tip gripper 102, height sensor 104, arrangement tray 106, moveable table 108, tip snipper 110, and a body gripper 112. These various components are arranged in a housing 114, which helps protect the various moving components of machine 100 from interference.

Tip gripper 102 is attached to a trolley 116, configured to move the tip gripper 102 into position for picking up a cone, as well as to lift the tip gripper 102 following picking up a cone and moving it into position for closure. Depending upon the requirements of a given implementation, trolley 116 may be configured to vertically lift in a controllable fashion. Other implementations may also alloy trolley 116 to move in a horizontal fashion, left to right and/or front to back, with respect to housing 114. Tip gripper 102 is configured to provide roto-linear fashion. In addition to linearly closing to pick up a cone by its tip, the tip gripper 102 is further configured to rotate about its longitudinal axis, which is in-line with the longitudinal axis of a cone when gripped. This rotational motion facilitates closing of a cone, as will be discussed in greater detail herein.

Height sensor 104, in embodiments, determines the height of the filled material in each cone placed within the arrangement tray 106 to facilitate guidance and control of the tip gripper 102, discussed below. Height sensor may be implemented using a visible or invisible laser rangefinder, infrared rangefinder, ultrasonic rangefinder, or any other technology suitable for accurately determining height (e.g. within a millimeter of accuracy, in some embodiments). Height sensor may be attached to trolley 116 and fixed in position relative to tip gripper 102 at a known distance or location, in embodiments. In some embodiments, height sensor 104 may be incorporated into tip gripper 102. In other embodiments, height sensor 104 may be positioned at a fixed location, where tip gripper 102's distance from height sensor 104 may be determined by encoders or similar indicators equipped to trolley 116 and/or tip gripper 102.

Arrangement tray 106, in the depicted embodiment, is configured with a multiple of apertures for receiving pre-filled but open cones. As can be seen in FIG. 1, the apertures of the arrangement tray 106 may be configured in a grid pattern, and are sized to hold each cone at a predetermined height. The apertures, aperture spacing, and aperture pattern on the arrangement tray 106 may vary depending upon the size of cone being processed, as well as the capabilities and size of the tip gripper 102. In other embodiments, arrangement tray 106 may be configured to accept cones within a range of sizes, where the other components of machine 100 are likewise configured to accommodate cones of varying sizes. The aperture pattern may further be established to enable relative ease of location and movement of the arrangement tray 106 and/or tip gripper 102, as well as to maximize the processing efficiency of machine 100.

Arrangement tray 106 may be attached at its base to moveable table 108. Moveable table 108, in embodiments, is configured to move arrangement tray 106 in x and y directions, e.g. left to right and front to back, with respect to housing 114. This x, y motion allows moveable table 108 to position each aperture in the arrangement tray 106, in turn, beneath the travel of tip gripper 102 and its trolley 116 so that tip gripper 102 can pick up a cone inserted into a given aperture. Where moveable table 108 moves in both x and y axes, trolley 116 may only need to provide vertical motion to tip gripper 102. Alternatively, trolley 116 is capable of x and/or y motion, moveable table 108 may only need to move in one direction, or may not need to move. Moveable table 108 may be equipped with encoders and/or stepper motors or a similar movement system to allow the moveable table 108 to move in a precise and repeatable fashion, to allow for precision location of each aperture.

Tip snipper 110 is configured, in embodiments, with cutting surfaces to cut or snip a tip off of a cone following closure by twisting. Thus, in the depicted embodiment, tip snipper 110 is configured with a scissors-like mechanism. Tip snipper 110 is secured to a moveable trolley 118 that, in embodiments, may move tip snipper horizontally along an x axis (left-right) with respect to housing 114. Trolley 118 may be configured to tilt or rotate tip snipper 110 to provide an angled cut to a cone, and may further be configured to move tip snipper 110 vertically, so that tip snipper 110 can be positioned correctly to snip the cone tip. The point at which tip snipper 110 snips the cone tip may be approximately the same as the point at which the tip gripper 102 grabs the cone tip, in some embodiments, while in other embodiments the point of snipping may vary to achieve a desired "wick" or twisted end length. In some embodiments, trolley 118 may not need to move vertically, such as where the snipping operation is performed while a cone is held in a gripper that can provide the proper vertical positioning, such as tip gripper 102 or body gripper 112. Further, trolley 118 may not need to move horizontally, in some embodiments, where the cone can be brought to the tip snipper 110, such as by horizontal movement of body gripper 112, discussed below.

Tip snipper 110 may be configured to grip the cone during or following tip snipping, to allow the finished and closed cone to be deposited in an exit bin. In some embodiments, trolley 118 may move along a y axis (front-back) with respect to housing 114, to allow the tip snipper 110 to deposit the finished cone in an exit bin located front or rearward from the tip snipper 110.

Body gripper 112 is configured, in embodiments, to securely hold the sides of a cone while its top is being twisted by tip gripper 102, to allow the twist to form. As will be discussed below, body gripper 112 may be configured to hold each cone so as to minimize any possible damage or pinching of the cone. Body gripper 112, in embodiments, is secured to a trolley 120, which allows body gripper 112 to move along an x axis, with respect to housing 114. Trolley 120 positions body gripper 112 in concert with trolley 116 of tip gripper 102 so that body gripper 112 can grip the cone while tip gripper 102 is twisting or closing the cone. Following the closing process, trolley 120 can move the body gripper 112 with a cone into position to be trimmed by tip snipper 110, and subsequently for depositing into an exit bin. Alternatively, as mentioned above, tip snipper 110 and trolley 118 may deposit the closed and trimmed cone into the exit bin. Trolley 120 may be capable of movement in other axes, i.e. a y axis (front-back) or a z axis (vertical), depending upon the needs of a given embodiment.

The various components of machine 100, namely, tip gripper 102 and trolley 116, height sensor 104, arrangement tray 106 and moveable table 108, tip snipper 110 and trolley 118, and body gripper 112 and trolley 120, may each be connected to a power source as well as a control module (not shown). The control module may coordinate the motions and actions of each of the various components to accomplish the task of closing and trimming all pre-filled cones that may be loaded into the arrangement tray 106. The control module may be any suitable control module now known or later developed, such as a microcontroller, embedded controller, or a general purpose computer. The various components may be powered by any suitable device, including electric motors, pneumatic motors, hydraulic motors, electric actuators or solenoids, pneumatic actuators, hydraulic actuators, or any other suitable powered device.

Figure 2:
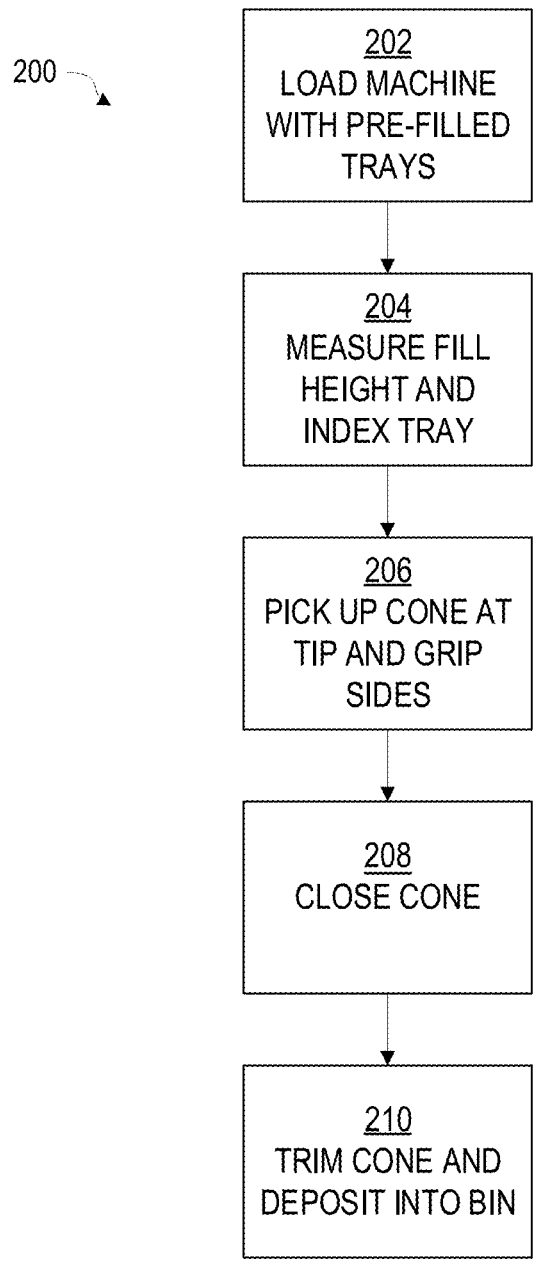
FIG. 2 is a flowchart of the operations of an example method for detecting and closing cones that may be executed by the machine of FIG. 1, according to various embodiments.

In FIG. 2, a method 200 for processing a pre-filled cone to a closed and trimmed cone, according to some embodiments, is disclosed. Method 200 may be performed in whole or in part by machine 100, and may be implemented in software, firmware, or via hardware as part of a controller for machine 100. The various operations of method 200 may, where appropriate, be performed out of order and/or partially. Additional operations may be included or substituted in some embodiments. In some embodiments, one or more of the operations may be omitted.

In operation 202, the machine, such as machine 100, is loaded with a tray, such as arrangement tray 106, that itself is loaded with pre-filled cones. In embodiments, each of the cones may be pre-filled up to roughly a predetermined level, established to ensure that a sufficient portion of the tip of the cone remains unfilled to provide room to accommodate the closing twist or fold. The filling of the cones and unfilled tip will be discussed in greater detail below. Each cone is placed into the tray oriented with the open tip facing up, both to prevent material from falling out, and to orient each cone for pick up by a tip gripper, such as tip gripper 102. The tray further may hold each cone in a predetermined pattern depending on the configuration of the machine, and to facilitate the tip gripper's function. The tray may be inserted onto a moveable table, such as moveable table 108, and secured so that the moveable table can precisely position the tray to facilitate the tip gripper in picking up each cone. In some embodiments, the tray may be precisely and stably secured to the moveable table using clamps, locating pins, machined inserts or protrusions, or any other suitable method.

Following filling and securing of the tray, in operation 204 of the example embodiment, the machine engages in sensing the fill height of each cone and indexing each inserted cone. A fill height sensor, such as height sensor 104, scans each cone in the tray and determines the fill height of each cone. The fill height is logged for each position on the tray, and may be measured in millimeters from a datum, such as the plane coincident with the top of the tray, or from the tip of the tip gripper. After measuring the height on a given aperture, the machine then moves the tray so that the next aperture on the tray is positioned under the fill height sensor. The machine moves the tray by actuating the moveable table upon which the tray was affixed in operation 202.

As the machine is scanning the tray with the fill height sensor, the machine may also record which apertures within the tray have a cone, and which apertures are empty. The machine, such as its controller, may be preprogrammed with the predetermined pattern of the tray apertures, and so can evaluate each aperture using predetermined systematic movements. In other embodiments, machine vision or sensing may be used to determine the location of the various apertures, allowing for dynamic programming of tray movement.

In embodiments, the fill height sensor may be fixed or positioned at a predetermined height about the tray. The fill height sensor may be positioned at a predetermined position with respect to the tip gripper. This can enable the fill height sensor to provide consistent fill height readings relative to the height of the tip gripper, allowing the use of preprogrammed constant offsets in computing where the tip gripper is to pick up a cone. The presence or absence of a cone in a given aperture can be ascertained from a reading from the fill height sensor; where a cone is not present, the sensed height will be significantly greater than expected if a cone is present. Moreover, the sensed height can further potentially detect unfilled cones, and alert a user of the machine of the presence and position of the unfilled cone. Similarly, machine vision or sensing can be used to determine the presence or absence of a cone, in some embodiments.

In operation 206, for each cone, the machine picks up each cone by the tip above the determined fill height with the tip grippers. The tip grippers are then withdrawn vertically, such as by a trolley 116, lifting the cone out of its aperture in the tray and away from the tray. The tip grippers may raise the pre-filled cone to a predetermined height. A body gripper, such as body gripper 112, may move in via a trolley, such as trolley 120, and position adjacent to the side of the cone held by the tip gripper. The body gripper may then grab the sides of the pre-filled cone sufficiently securely so that it cannot rotate, but without otherwise crushing the cone or causing it to rupture. The body gripper may grab the sides of the pre-filled cone at a preset height below there the tip grippers grip the cone. It will be appreciated that the body gripper may be calibrated to grip a filled cone, with the fill material offering some structure and rigidity to allow gripping; an empty cone may not be capable of being gripped.

In operation 208, the cone is closed by the tip gripper. In embodiments, the cone is closed by the tip gripper rotating about the longitudinal axis of the cone. As the unfilled tip of the cone is held immovably by the tip gripper and the body of the cone is held immovably by the body gripper, the unfilled paper twists with the tip gripper's rotation, thus closing the cone. This process will be described in greater detail herein. Other embodiments may close the cone tip in a different fashion than twisting, such as rolling, folding, crushing, heat sealing, or any other suitable method depending upon the specifics of a given embodiment and/or the nature of the cone material.

In still other embodiments, the body gripper may rotate with the tip gripper remaining stationary, instead of the tip gripper rotating. In such an embodiment, the body gripper will rotate about the longitudinal axis of the cone, causing the cone to also rotate about its longitudinal axis. As the tip gripper remains stationary with the tip held immovably and not rotating, the cone is closed similar to its closure when the tip gripper rotates and the body gripper remains stationary.

Following cone closing, in operation 210 the cone is trimmed with a tip snipper, such as tip snipper 110. The tip grabber may first release the closed tip of the cone with the body gripper maintaining a hold on the cone sides, thus revealing the closed tip. The cone may then be moved to the tip snipper via the body gripper, or the tip snipper may move to the cone. The tip snipper then engages the closed tip at a predetermined distance below its end, and trims the tip. In some embodiments, the tip snipper may also grab the cone, allowing the body gripper to release the cone and prepare for the next cone to be closed. The predetermined distance at which the tip snipper engages the closed tip may be the same as, or differ from, the predetermined distance calculated for gripping the gone by the tip grabber.

Once trimmed, the cone is deposited into an exit bin. Either the body gripper or the tip snipper may move and deposit the finished cone into the exit bin. In some embodiments, the exit bin may be located immediately below the tip snipper, allowing the body gripper or tip snipper to simply release the finished cone into the exit bin. In other embodiments, the body gripper or tip snipper may rotate or otherwise move to deposit the finished cone into the exit bin.

Figure 3:
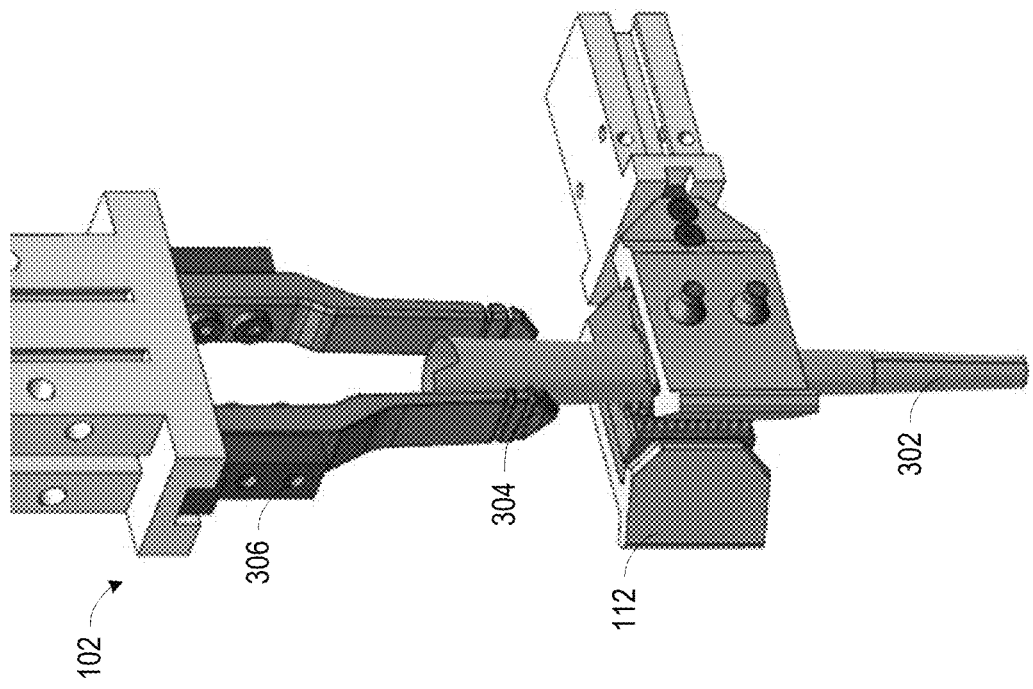
FIG. 3 is a perspective view of a cone being gripped by an example pair of twisting jaws and an example pair of holding jaws, according to various embodiments.

In FIG. 3, the arrangement of tip gripper 102, body gripper 112, and filled cone 302 is illustrated. This arrangement is the result of completion of operation 206 of method 200, described above, in preparation for cone closing in operation 208. The process of cone closing will be described below with respect to FIGS. 7A to 9. The tip of each of the jaws 306 of the body gripper includes a tip gripper finger 304, which, in the depicted embodiment, are each bolted to its corresponding jaw 306. Each tip gripper finger 304 may be constructed from a rigid material, such as a polymer material, and may include one or more grooves. The grooves may, in some embodiments, be fitted with a rubber o-ring or similar elastic band material, to enhance the grip of the tip gripper 102 on the tip of cone 302. In other embodiments, the tip gripper finders 304 may be coated or partially constructed from an elastomeric material that enhances grip. Still other embodiments may construct each tip gripper finger from metal, wood, composite, ceramic, or any other material suitable for a given implementation. The tip gripper finger 304 may be detachable from its tip gripper jaw 306 to be replaced, as in the depicted embodiment. In other embodiments, the tip gripper finger 304 may be formed as part of jaw 306.

Figure 4:
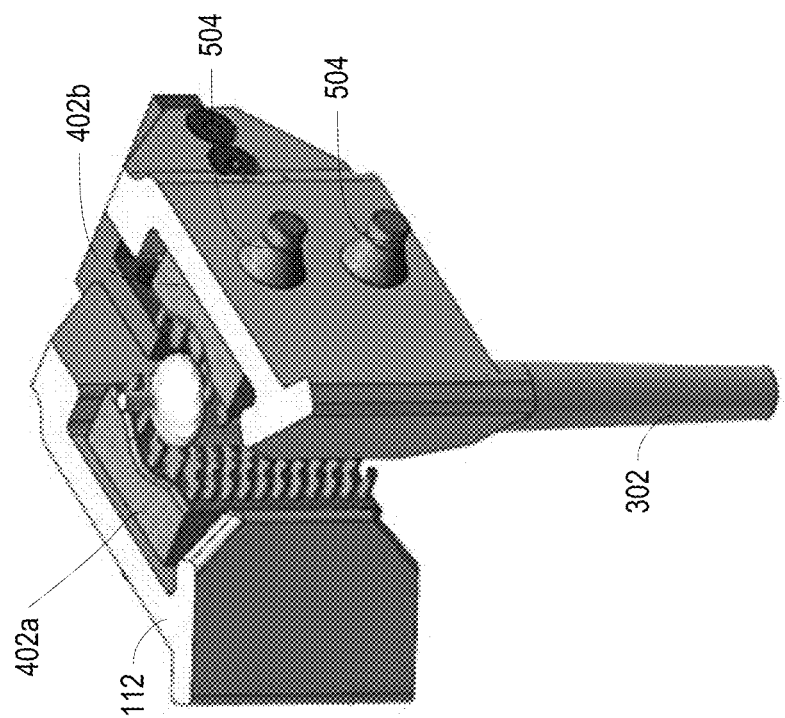
FIG. 4 is a perspective view of a trimmed cone gripped on its sides by the holding jaws of FIG. 3, according to various embodiments.

In FIG. 4, a close up of the body gripper 112 in grip of cone 302 is depicted, with cone 302 having been twisted close and snipped. Thus, FIG. 4 illustrates the result of completion of operation 208 and in preparation of operation 210 of method 200, described above. Also illustrated are the two grip pads 402a and 402b (collectively or generically, grip pad 402) which are installed onto body gripper 112, which help provide a rotation-free and slip-free grip upon the cone 302 without crushing or otherwise damaging the cone and its fill material.

Figure 5A:
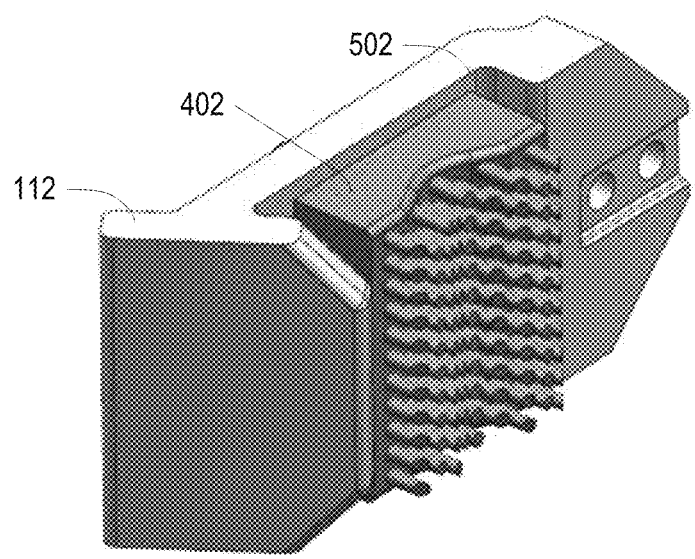
FIG. 5A is a perspective view of one of the jaws of the holding jaws of FIG. 3, illustrating an example gripping surface in place, according to various embodiments.
Figure 5B:
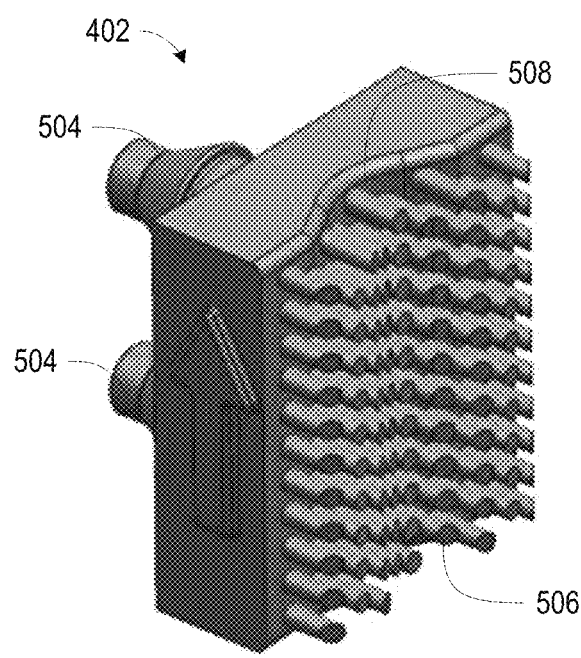
FIG. 5B is a perspective view of the gripping surface of FIG. 5A apart from the jaws, according to various embodiments.
Figure 5C:
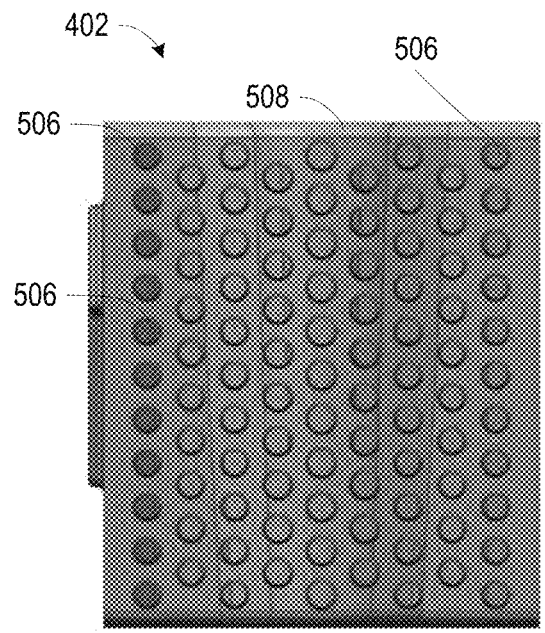
FIG. 5C is a front view of the example gripping surface of FIGS. 5A and 5B, illustrating the configuration of the gripping surface, according to various embodiments.

FIGS. 5A-C depict a close up of the grip pad 402 that is equipped to the body gripper 112. As can be seen in FIG. 5A, the grip pad 402 is disposed within a recess 502 in the jaw of the body gripper 112, that is roughly shaped to accommodate the body of the grip pad 402. In FIG. 5B, a plurality of protrusions 504 extending from a back side of grip pad 402 are visible. As can be seen in FIG. 4, the protrusions extend through corresponding apertures on each half of body gripper 112 to secure each grip pad 402 to its corresponding gripper half. FIG. 5B further illustrates the profile of grip pad 402, which includes a valley 508, to accommodate the round shape of a cone 302 (shown in FIGS. 3 and 4), and the lining of the grip pad with a plurality of elastomeric, deformable fingers 506. FIG. 5C provides a front view of the face of the grip pad 402, showing the rows of fingers 506 presented in a staggered configuration. This staggered configuration of fingers 506 helps ensure a solid grip on the cone 302 that is non-damaging yet resists cone 302 rotating as its tip is twisted shut by tip gripper 102.

Further, as may be seen in FIG. 5C, the valley 508 tapers from wider to narrower vertically along the height of grip pad 402. This tapering approximately matches and accommodates the frusto-conical shape of cone 302, and helps ensure a substantially even grip along the gripped portion of the cone 302. Without this tapering, a greater pressure may be placed near the top of the cone 302, and/or cone 302 may be not be held stably. Alternatively, or additionally, in some embodiments the fingers 506 may be of varying length to accommodate the taper of the cone 302. For example, grip pad 402 to alternatively be implemented with a minimal or no valley 508 with no tapering, instead varying the heights of the plurality of fingers 506 to create a valley with a tapered profile. Each grip pad 402 may be constructed from a relatively soft and temporarily deformable elastomeric material, such as silicone or rubber. The size of each of the fingers 506 may be selected and/or varied to adjust the degree to which the grip pad 402 conforms to a cone 302 when gripped. The elastomeric nature of the fingers 506 helps the grip pad 402 to reliably grip a cone despite variations in the smoothness of the surface of the cone 302, which may result from variances in the hardness and packing of the fill material.

Figure 6:
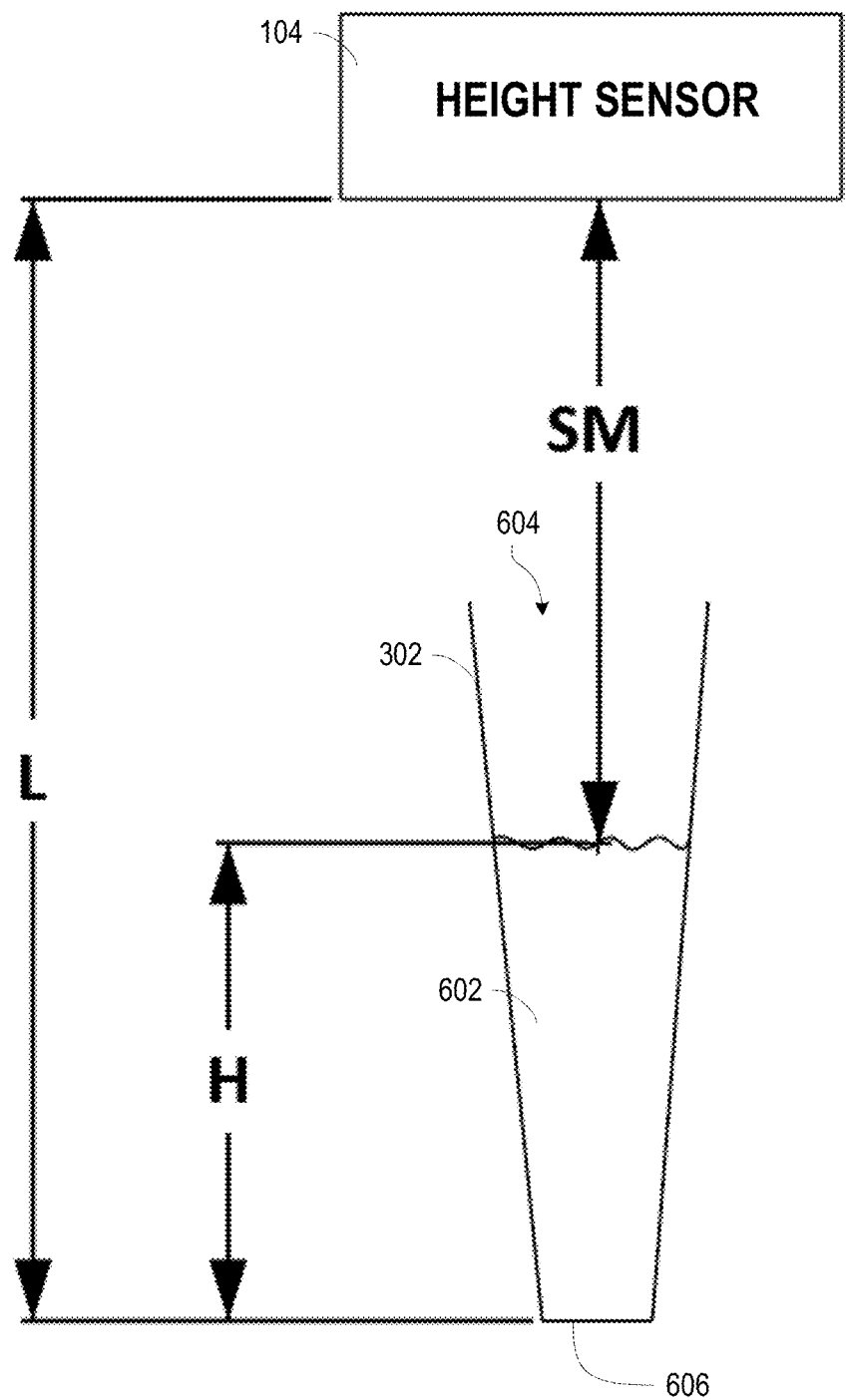
FIG. 6 is a diagram illustrating a profile view of an example filled cone and its geometric relationship to a sensor, according to various embodiments.

Turning to FIG. 6, the geometry of a cone 302 to the height sensor 104, according to some embodiments, is illustrated. A length L defines the distance from a bottom 606 of cone 302 to a datum of height sensor 104, typically the bottom-facing surface of the height sensor 104. A person skilled in the relevant art will understand that the selection of the datum may be arbitrary, and determined by software that may run machine 100. The bottom 606 of cone 302 typically rests on a bottom surface of arrangement tray 106, or is otherwise established by arrangement tray 106 as the average location of bottom 606 of each cone 302 loaded into arrangement tray 106. From the bottom 606 of cone 302, fill material 602 is inserted to a height H, which defines the fill height of cone 302. The top of fill height H to the tip of cone 302 defines the empty tip space 604 for the remainder of the total height of the cone 302. This empty tip space 604 creates the tip of cone 302 that is subsequently twisted or otherwise closed, to seal in the fill material 602. From the top of the fill material 602 to the datum of height sensor 104 is distance SM, which added to height H forms length L.

In embodiments, machine 100 and arrangement tray 106 are configured to accept a single size of cone in a given batch, i.e. all apertures of a given arrangement tray 106 are of a single size to accept a predetermined cone size. A different tray with different aperture sizes is needed for each different cone size. In other embodiments, machine 100 may be implemented such that the length L can vary, with machine 100 accepting a mix of different cone sizes. In such implementations, the bottom 606 of each cone may be individually sensed using any appropriate sensing mechanism and/or method.

It should be appreciated that the empty tip space 604 needs to be deep enough to leave sufficient cone material to form the twist or closure. For example, for a typically sized cone, empty tip space 604 may have a depth of approximately 20 mm/2 cm, between the top of the cone 302 and the top of the fill material 602. This depth will vary depending upon the cone size 302, as well as the cone material required for the number of twists or other type of closure needed to achieve a consistent pack of the fill material 602 and closure. If the cone 302 is overfilled, empty tip space 604 may be insufficient to properly close the cone 302, and would result in an improper pack or cone rupture. Height sensor 104 can, in embodiments, detect an overfill condition, such as when distance SM is shorter than a predetermined threshold, the threshold established based upon the cone size.

Height sensor 104, as mentioned above, may be implemented as a laser or other rangefinder, which projects down and directly measures distance SM. In embodiments, the length L is predetermined by the vertical positioning of the arrangement tray 106 relative to the datum of height sensor 104, which are in a known relationship to each other in embodiments. The length L can also be computed by initial calibration of the machine 100, coupled with encoders or sensors coupled to any mechanisms that move the height sensor 104 (such as trolley 116) or arrangement tray 106 (such as moveable table 108). The information from the encoders or sensors may be passed to a lookup table or similar structure that correlates the encoder position with a particular vertical position of height sensor 104 and/or arrangement tray 106, thus providing length L. By subtracting distance SM from length L, fill height H is determined for a given cone 302.

Figure 7C:
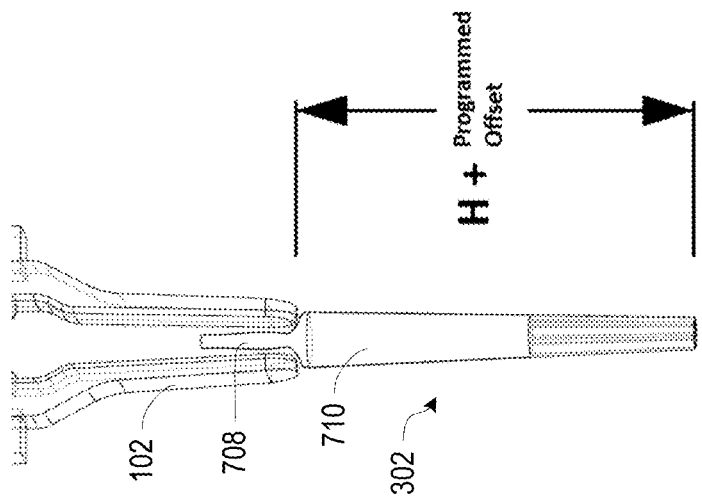
FIG. 7C illustrates the example cone of FIG. 2A following closing, according to various embodiments.
Figure 7B:
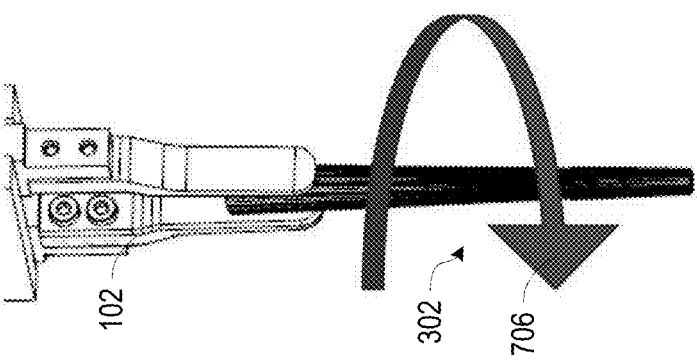
FIG. 7B illustrates the example cone of FIG. 2A in process of being closed, according to various embodiments.
Figure 7A:
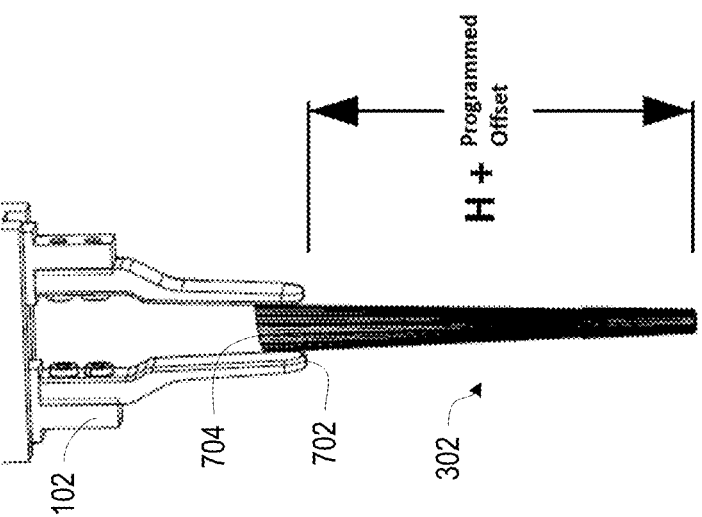
FIG. 7A illustrates an example open, filled cone gripped in preparation for closing, according to various embodiments.

This computed fill height can then be used to determine where the tip grippers 102 are to grip the tip of cone 302 to ensure a proper closure. FIGS. 7A-C graphically illustrate each step of the closure process. In FIG. 7A, tip gripper 102 meets cone 302 either by lowering towards arrangement tray 106 (shown in FIG. 1) or by arrangement tray raising towards tip gripper 102. The tip gripper 102 is positioned so that its jaws extend down cone 302 until the tips 702 of the jaws reach the computed height H, plus a predetermined or preprogrammed offset above the top of the fill material 602. Thus, a tip portion 704 of cone 302 is gripped by tip gripper 102, the tip portion 704 being an upper part of the empty tip space 604. A portion of the empty tip space 604 remains, roughly equal to the preprogrammed offset. The preprogrammed offset is selected based upon the size of cone 302, which may be predetermined prior to processing. The preprogrammed offset is calculated to result in accurate and consistent packing through the closing process. The amount of the preprogrammed offset may thus vary with changes in variables such as cone size, cone flare, material type, cone material, and any other variables that may impact where the cone should be gripped to provide a consistent closure.

It will be appreciated by a person skilled in the relevant art that the height H plus preprogrammed offset will vary depending upon the sensed height of the top of the fill material 602. This variance helps ensure consistent packing of all cones 302 processed by machine 302, as it accounts for variances in fill height of each cone 302 that result from either inaccurate filling, irregularities in the fill material, varying fill material densities or hardness, etc.

In FIG. 7B, the tip gripper 102 rotates 706 about a longitudinal axis of the cone 302, creating a twist that closes the cone 302 and provides a proper pack to the enclosed fill material 602. The number of twists may be predetermined based upon the preprogrammed offset. In some embodiments, the number of twists may be between 5 and 7, such as where the empty tip space 604 is approximately 20 mm. The result of twisting is depicted in FIG. 7C, where a twist 708 has been formed, resulting in a body 710 of consistent and properly packed fill material 602.

FIG. 8 depicts the results of trimming the twist 708 formed from closing. As seen on the left, the twist 708 is in an untrimmed 802 condition. In the depicted embodiment, the cone 302 is trimmed by a tip snipper 110, to the same distance of the fill height H plus the preprogrammed offset, the same distance used to establish the grip location of tip gripper 102. The application of the preprogrammed offset ensures that the twist 708 is not overtrimmed, which could result in the twist coming undone, but results in a proper trimmed end 804. Trimmed end 804 is not overly long, which would otherwise result in an undesirable "wick" that would need to burn down when the cone 302 is ignited, and possibly result in ash or an ember falling from the cone. However, in other embodiments, the tip snipper 110 may trim the cone 302 to a different height, potentially calculated as fill height H plus a second, different preprogrammed offset intended for trimming. The application of a second preprogrammed offset can allow the tip of cone 302 to be trimmed to a desired length to leave a portion of the twisted end as a "wick". Thus, in some embodiments tip snipper 110 may trim cone 302 above or below the point along the length of cone 302 at which the tip gripper 102 grips the tip.

Figure 9:
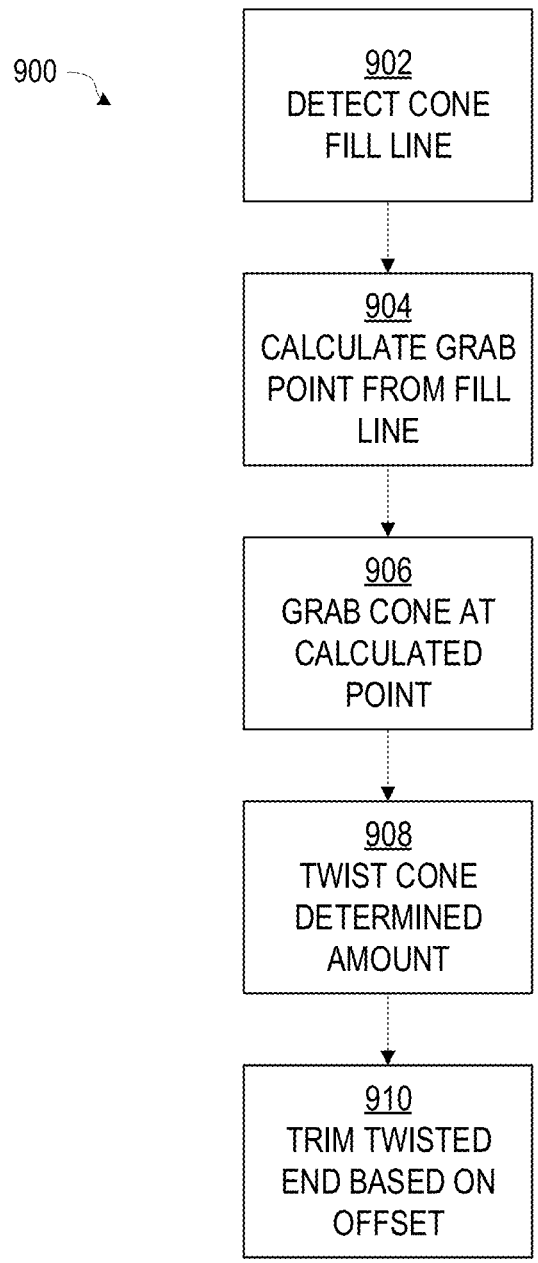
FIG. 9 is a flowchart of the operations of an example method for detecting where to grab and fill a cone, according to various embodiments.

FIG. 9 is a flowchart of operations for a method 900, according to embodiments, that may be followed as part of method 200, and may be performed by machine 100. The operations of method 900 may be performed in whole or in part, may be performed out of order where possible, and operations may be added or omitted. Starting in operation 902, the cone fill height is detected by a height sensor, such as height sensor 104. The actual value of the fill height may be computed from a measurement based upon the known distance between the height sensor 104 and the bottom of each cone 302, as discussed above with respect to FIG. 6.

In operation 904, the grab point on the cone is calculated from the fill height, by adding the predetermined offset. As discussed above, the predetermined offset is computed based upon cone size, number of twists, and/or other relevant factors. Depending upon the specifics of a given implementation, the directly measured value (SM with reference to FIG. 6) may be useable rather than a calculated height H. Where distance SM is used, the predetermined offset would be subtracted from distance SM rather than added, as will be understood.

Next, in operation 906, the tip gripper, such as tip gripper 102, is lowered down to grab the tip of the cone at the calculated grab point from operation 904. Alternatively/additionally, the tray with the cone may raise until the tip of the cone is placed at the grab point into the tip gripper. A body gripper, such as body gripper 112, may engage the sides of the cone to hold the cone immovably.

In operation 908, the tip gripper grips the tip of the cone, and rotates about the cone's longitudinal axis to form a twist to close the cone. The body gripper prevents the body from rotating, ensuring the twist forms. The number of twists may depend upon the amount of cone tip that extends above the top of the fill, and may vary depending upon the location of the grab point. For example, where the grab point about the top of fill (e.g., the predetermined offset) is relatively high, more twists may be required to achieve an optimum packing and closure compared to a relatively low or short grab point. The machine may, in embodiments, adjust the number of twists automatically based upon the predetermined offset.

As mentioned above, in some alternative embodiments, the body gripper may instead be configured to rotate, to cause the cone to rotate about its longitudinal axis while the tip gripper is configured to hold the tip of the cone stationary.

In operation 910, the tip gripper releases the tip, and the cone is conveyed to a tip snipper, such as tip snipper 110. The tip snipper cuts the twist at the grip point, i.e. predetermined offset, in some embodiments, or at a second predetermined offset in other embodiments, as discussed above.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A method for closing a pre-filled cone, comprising:
   detecting, with a height detector, a height of a fill material in the cone;
   calculating a grab point by adding a predetermined offset to the detected height;
   gripping, with a tip gripper, the cone at the grab point;
   gripping, with a body gripper, the cone below the detected height; and
   rotating, about a longitudinal axis of the cone, the tip gripper to form a twist, a number of rotations of the tip gripper to form the twist determined based on the predetermined offset.

2. The method of claim 1, further comprising trimming, with a tip snipper, the twist at the grab point.

3. The method of claim 2, further comprising:
   providing an arranged tray with a plurality of cones, including the pre-filled cone, each of the plurality of cones inserted into one of a plurality of apertures on the arranged tray; and detecting, with the height detector, whether a cone is present at each of the plurality of apertures.

4. The method of claim 3, further providing a notification if the detected height is below a predetermined threshold.

* * * * *